United States Patent

[11] 3,633,040

| [72] | Inventor | Gordon H. Baxter<br>P.O. Box 186, Circleville, N.Y. 10919 |
|---|---|---|
| [21] | Appl. No. | 12,196 |
| [22] | Filed | Feb. 18, 1970 |
| [45] | Patented | Jan. 4, 1972 |

[54] REMOTE CONTROL VEHICLE-STARTING SYSTEM USING A LOW AC VOLTAGE SUPPLY
2 Claims, 2 Drawing Figs.

[52] U.S. Cl. ........................................... 290/38, 290/37
[51] Int. Cl. ........................................... F02n 11/00
[50] Field of Search ........................................... 290/36, 37, 38, 60, 38 A

[56] References Cited
UNITED STATES PATENTS

| 2,591,618 | 4/1952 | Schaeffer | 290/38 |
| 2,915,644 | 12/1959 | Hillig | 290/38 X |
| 3,053,989 | 9/1962 | Poole et al. | 290/37 |
| 3,063,044 | 11/1962 | Caplette | 290/37 X |
| 3,163,770 | 12/1964 | Smedley | 290/38 |
| 3,357,417 | 12/1967 | Baumann | 290/38 X |
| 3,371,656 | 3/1968 | Stauffer et al. | 290/37 X |

*Primary Examiner*—G. R. Simmons
*Attorney*—Joseph Levinson

ABSTRACT: A remote control console is connected by plug-in cable to a motor vehicle engine control unit positioned in a motor vehicle which is to be started. Actuation of an ignition switch in the console activates a relay closing circuits to the vehicle's ignition coil, heater and engine condition indicators, for example, oil pressure. A gas advance circuit is provided to prime the engine via a throttle advance device, and a start switch closes a circuit to the engine starter via a relay. An intercommunication system is provided to monitor all engine sounds.

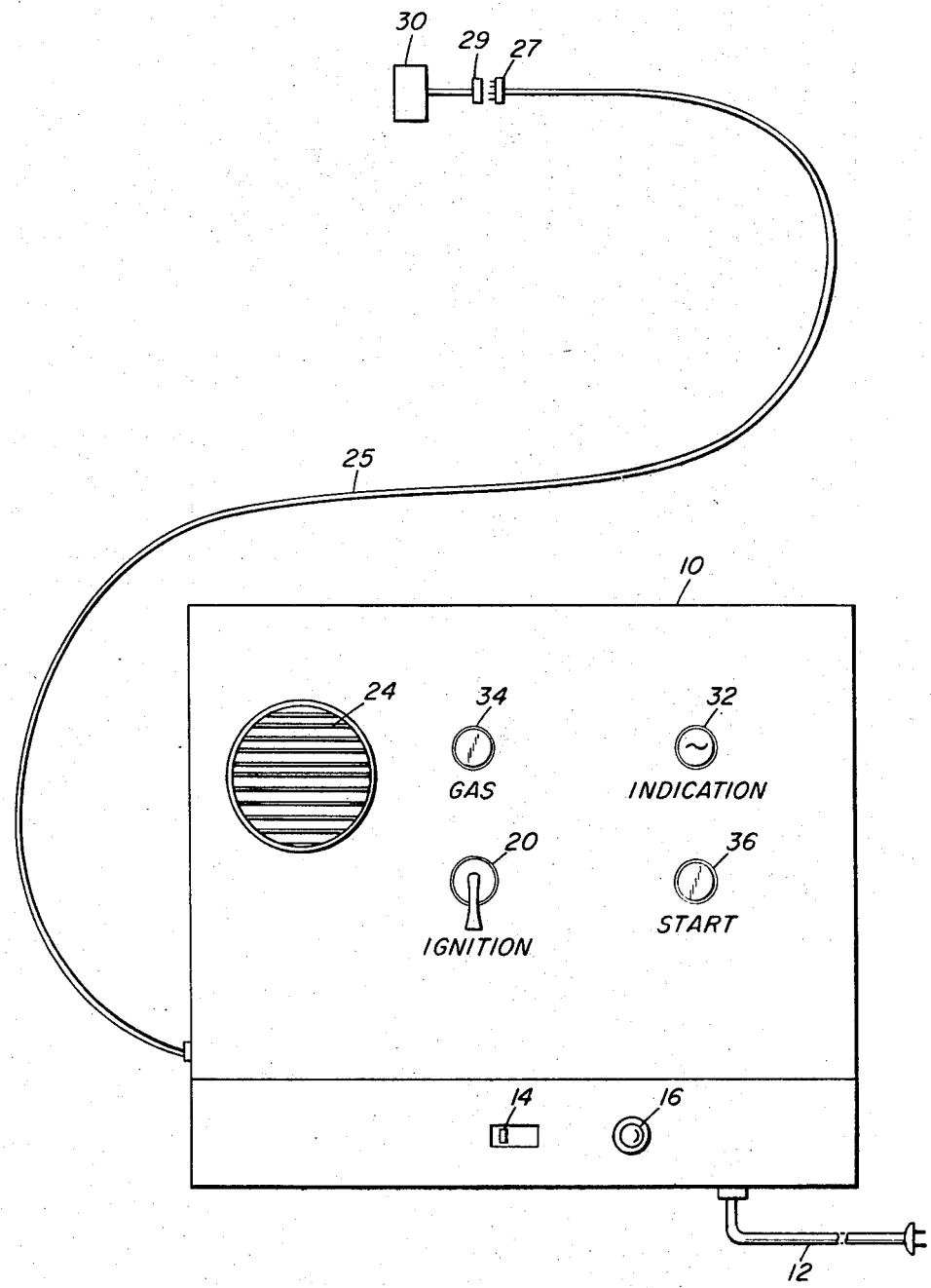

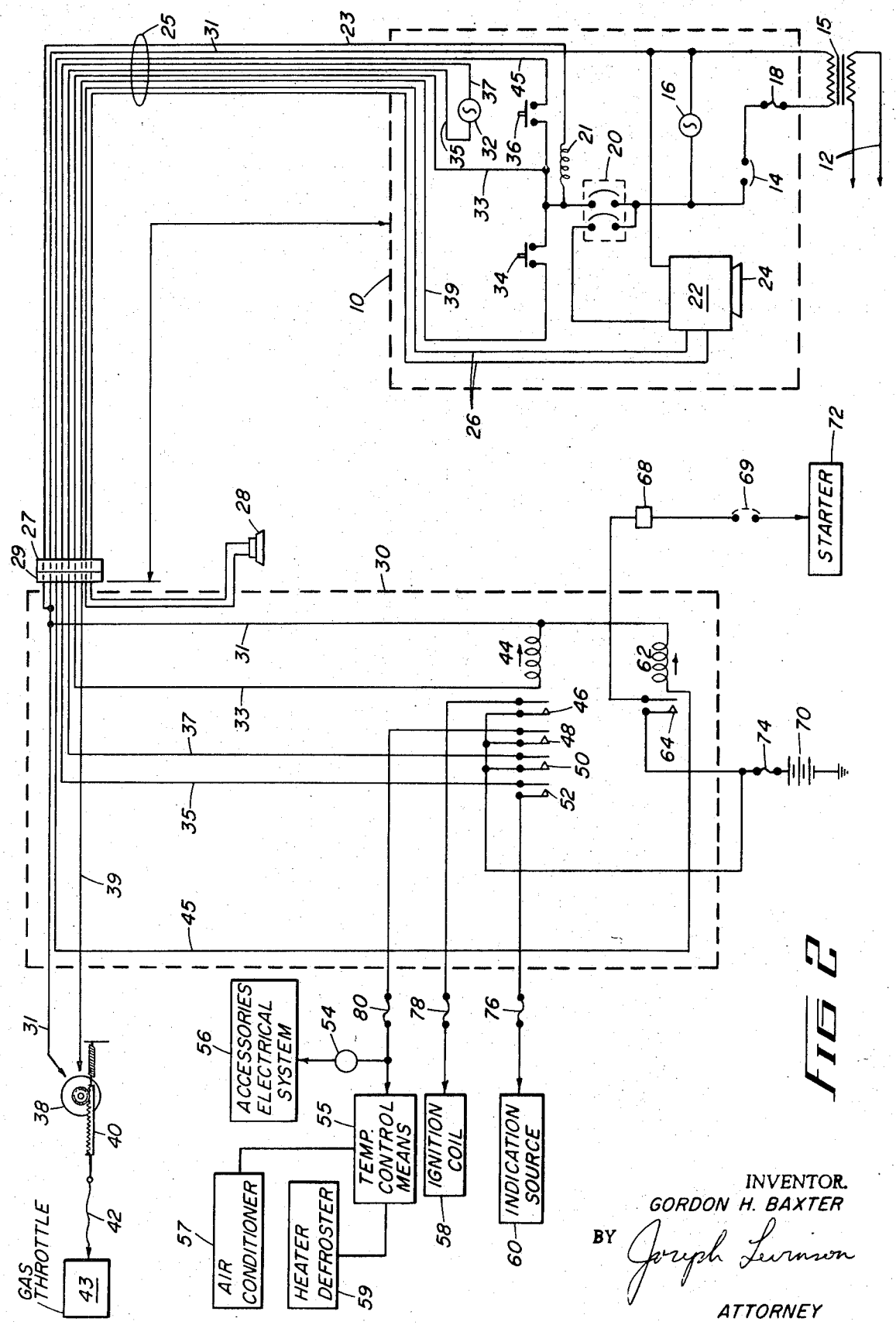

REMOTE CONTROL VEHICLE-STARTING SYSTEM USING A LOW AC VOLTAGE SUPPLY

BACKGROUND OF THE INVENTION

Many owners of cars, trucks, station wagons, and other motor vehicles must park their vehicles outdoors or in open car ports or other similar conditions which expose the vehicles to the elements. Ice, snow, cold and damp conditions generally require the proper warming up of the car so that it will function properly, not die out, or have its visibility hampered by ice, fog and frost on the windshield. Such conditions are dangerous both to the occupant and the vehicle. Also, in very warm climates, closed vehicles provide a stifling atmosphere until the air conditioner has a chance to cool off the car after engine warm-up.

Accordingly, it is an object of this invention to provide a remote control vehicle-starting system which enables the operator to start and warm up an engine in any weather even from inside a residence.

A further object of this invention is to provide a remote control vehicle-starting system which permits the remote defrosting of vehicle windows and the warming of the vehicle's interior, or alternatively the cooling thereof which will satisfy the operator's needs in all types of weather conditions.

SUMMARY OF THE INVENTION

A remote control motor-vehicle-starting system is provided having an engine control unit mounted in a vehicle which is to be started from a remote vantage point, and a remote control console connected by control cable to the engine control unit. Means are provided in the engine control unit to be actuated remotely from the remote control console for enabling the engine's ignition coil, heater, and engine condition circuits, a throttle advance device for setting the gas and choke controls, and a start relay for starting the vehicle. An intercom system is provided to remotely monitor the engine sounds during all operations.

BRIEF DESCRIPTION OF THE DRAWINGS

FIG. 1 is a diagram showing the control units interconnected by cable which comprise the remote control motor-vehicle-starting system embodied in this invention.

FIG. 2 is a schematic diagram of the remote control motor-vehicle-starting system of this invention.

DESCRIPTION OF THE PREFERRED EMBODIMENTS

Referring now to FIG. 1, a remote control console unit 10 is shown connected by a control cable 25 via a plug 27 and a receptacle 29 to an engine control unit 30. The console unit 10 is located at a point remote from an auto or motor vehicle which is to be started remotely from that point. The cable 25 extends from the console unit 10 to the motor vehicle which contains the engine control unit 30. The engine control unit 30 may be mounted conveniently under the hood of the vehicle with the receptacle 29 being positioned on a convenient external location of the motor vehicle, for example, on the front bumper, grille, or fender. The exact locations of the engine control unit 30 and its receptacle 29 may be adaptable to the convenience of the interconnections which must be made in the vehicle's electrical system, and may vary depending on the type of vehicle and the space that is available. The space requirements of the unit 30 are small, which gives flexibility in its positioning. Power for the console is provided by a cord 12 which may be plugged into conventional line sources.

FIG. 2 shows the schematic diagram of the system, in which power cord 12, when suitably connected, provides via a power switch 14 and an isolating transformer 15, a source of low-voltage power throughout the entire system. The isolating transformer 15 steps down the standard alternating current voltage to 6–24 volts to eliminate the danger of electrical shock. An indicator lamp 16 is utilized to indicate that power for the remote control console 10 is on, and a fuse 18 provides overload protection. The console 10 is provided with a master switch called the ignition switch 20, which has an on-off position. Switch 20 is preferably an electromagnetic latch-type switch, which is automatically returned to its off position when the control cable 25 has its plug 27 disengaged from the receptacle 29. For this purpose a holding coil 21 is provided in circuit through leads 23 and 31 and is opened via the plug 27 and receptacle 29 to restore the ignition switch 20 to its off position. The purpose of holding coil 21 is to insure that the ignition switch 20 is not inadvertently left on, which at a later time would energize any of the associated circuits merely by reinserting the plug 27 in the receptacle 29. In its "on" position the switch 20 provides power for an intercom unit 22 having a transducer 24 and a remote transducer 28 in the engine control unit 30, connected via leads 26. The closing of the ignition switch 20 also applies power via leads 31 and 33 to a relay 44 which closes its associated sets of contacts 46, 48, 50 and 52. Contacts 46 are connected to the ignition coil 58 of the engine and to the battery 70; contacts 48 are connected between the temperature control means 55, which controls the heater and/or air conditioner, to the battery 70, contacts 50 are connected between an indicator lamp 32 via lead 37 in the console 10 and the battery 70; while contacts 52 are connected to an indication source 60 in the engine via lead 35 to the indicator lamp 32 in the console 10. Accordingly, applying power to the relay 44 closes all of the aforesaid circuits and puts them into operative condition. The indication source 60 may be provided by the oil pressure system, the generator, or alternator, whichever indication is desired, and that source when actuated will light the lamp 32 on the console 10 via leads 35 and 37. All the aforesaid circuits are protected by fuses or circuit breakers 74, 76, 78 and 80. Blocking diodes 54 are connected in series with the accessories system 56 to prevent the possibility of feedback from the vehicle's temperature control means 55 to the vehicle's electrical accessory system to prevent the operation of other accessories such as radio, windshield wipers, etc. when the ignition switch 20 is on. The temperature control means 55 may be a single control for both the air-conditioner 57 and heater-defroster 59, as is shown, or the temperature control means 55 may have separate controls, each of which would require a separate set of contacts or proper interconnection to make a unitary control.

The console 10 is also provided with a gas switch 34, which is a pushbutton, momentary ON switch. Closing of switch 34 provides power via the ignition switch 20 and leads 39 and 31 to a throttle-advance device 38 illustrated as an electric motor. The throttle-advance device may be in the form of an electric motor of a vacuum or air device. The purpose of the throttle-advance device 38 is to advance the vehicle's fuel throttle, priming the engine and resetting the choke control. The throttle-advance device 38 must be installed on the vehicle's engine. In its illustrated form, a motor 38 is shown driving a rack 40 which controls a flexible cord 42 connected to the gas throttle 43. After the switch 34 is released, the throttle-advance device 38 is designed to restore the fuel throttle setting to a neutral position by allowing the motor to release the rack, which slackens the cord 42. Other types of construction may be utilized, and a permanent rigid link may be provided between the motor and the gas throttle as long as it can be released to its normal idling position when the gas switch 34 is opened. As was pointed out, vacuum or air-type devices could also be utilized in place of the motor-driven device for performing the aforesaid functions.

The console 10 also includes a start switch 36 which is a pushbutton, momentary, ON switch, similar to the gas switch 34. The start switch 36 applies power via leads 45 and 31 to actuate a start relay 62 which closes its pair of associated contacts 64. The contacts 64 are connected between the battery 70 and an intake manifold switch 68 and a gearshift safety switch 69 to the vehicle starter 72. Accordingly, the momentary actuation of the starter switch 36 closes the circuit between the battery 70 and the starter 72 of the vehicle. The intake manifold, vacuum-operated switch 68 is connected in series in this fashion for conventional reasons, because it opens the circuit to the starter when the engine starts. The gearshift safety switch 69 prevents the starting of the vehicle when in gear. The intercom speaker 24 monitors all engine sounds, so that the cranking, starting, and engine speed are clearly audible and discernible to the user.

Now that the various parts of the remote control system have been described, its operation will be briefly explained. Before connecting the system, the vehicle should be parked with the gearshift either in the "park" or "neutral" position with the parking brake set. The ignition switch in the vehicle is turned off, and may be locked if desired. The heater and/or air conditioner and/or defroster controls are set to the desired positions. It does not matter if the electrically powered accessories, such as the radio, windshield wiper, etc., are left in their operating conditions, because the blocking diodes 54 will prevent them from going on when the vehicle is started remotely. The vehicle's doors may be locked with no interference to the remote starting system; this is a distinct advantage if the car is to be left overnight after being rigged for remote starting. When the vehicle has been prepared as indicated, the plug 27 of the control cable 25 is inserted firmly into the receptacle 29 of the engine control unit 10. This links the remote console 10 via the control cable 25 to the engine control unit 30. In accordance with the operator's desire, starting may then be accomplished from the site of the remote console 10 by first energizing the remote console by switching on the power switch 14. The ignition switch 20 is then turned to its "on" position, activating relay 44 which closes its associated contacts 46, 48, 50 and 52, which will also light the indicator lamp 32. The gas switch 34 is then actuated two or three times, which will prime the carburetor and set the choke to its proper temperature setting due to the throttle control device 38. The start switch 36 is then closed to activate relay 62, closing the contacts 64 and placing the starter 72 in circuit with the battery 70. The sound of the engine cranking may be heard over the intercom speaker 24. When the engine is heard to start and/or when the indicator light 32 is extinguished, the starter switch 36 is released. After an interval of 10 –15 seconds, the gas advance switch 34 is again actuated to reset the degree of carburetor choke and to set the engine at its normal idling speed. The sound of the vehicle motor will be heard over the intercom speaker 24, which will provide guidance in this operation. At this point in time the heater and defroster or air-conditioner will be operating in the manner previously set on the controls. When the vehicle's engine has been running long enough to be properly warmed up, the operator may go to the vehicle and turn the ignition key to its "on" position, being sure not to turn it so far as to actuate the starter while the vehicle is running. At this point the plug 27 is disengaged from the receptacle 29, and the car may be driven away. As described above, the disengagement of the plug 27 from the receptacle 29 allows the ignition switch 20 to return to its "off" position.

When not in use, the cable plug and car cable receptacle may be protected by waterproof type hoods. Although the outlined procedure may seem lengthy, it is actually no more complicated than starting the vehicle in the traditional driver-in-the-front-seat manner, is much more convenient, comfortable, and time-saving. It is also considerably safer to drive away a properly heated car, particularly in inclement weather conditions, because it may be dangerous to operate a vehicle which is not properly defrosted, giving poor visibility. There is also the possibility of the engine dying in its initial few miles before the engine has had time to warm up.

The main connection of the control cable 25, which links the remote control console 10 to the vehicle engine control 30, is by plug and receptacle, and this cable utilizes a source of AC potential to operate. Because of these features, there is little possibility of anyone starting the vehicle's engine by tampering with the receptacle when it is disengaged from the cable plug. Furthermore, it is not possible to start the engine through this system when coupled from any other point than the control console. Additionally, the fact that a great many different types of plugs and receptacles may be utilized, as well as different voltages, renders interchangeability of various types of consoles difficult, if not impossible. That is, someone else with a remote control starting system would not be able to use his starter to start your vehicle, just as the owner of a certain make, year and model can't use his ignition key to start another car of the same make, year and model.

Although other changes and modifications, varied to fit particular operating requirements and environments will be apparent to these skilled in the art, this invention is not considered limited to the examples chosen for purposes of disclosure, and covers all changes and modifications which do not constitute departures from the true spirit and scope of this invention.

I claim:

1. A remote control motor-vehicle-starting system for a motor vehicle with an engine having a gas throttle, temperature control means, ignition coil, indication source, a starter and a battery, comprising, in combination,
   a. a remote control console having a source of low AC voltage,
   b. a motor vehicle engine remote control unit positioned on the vehicle and connected to said console by a plug-in control cable whereby said remote control unit is adapted to be remotely controlled by said console utilizing said low AC voltage source,
   c. first circuit means including a plurality of relay contacts in said remote control unit for coupling when said contacts are closed said ignition coil and temperature control means to the battery of said motor vehicle,
   d. first relay means having said plurality of relay contacts in said remote control unit,
   e. first switch means in said console connected via said control cable to said first relay means to actuating said first relay means by applying said low AC voltage source thereto, thereby closing said plurality of contacts to connect said temperature control means and said ignition coil to said battery.
   e. second circuit means including a pair of relay contacts for coupling said starter to said battery when said relay contacts are closed,
   g. second relay means having said pair of relay contacts in said remote control unit,
   h. second switch means in said console connected via said control cable to said second relay means for actuating said second relay means by applying said low AC voltage source thereto thereby closing said pair of relay contacts to connect said starter to said battery for starting said engine.
   i. a throttle advance means connected to said remote control unit coupled directly to said gas throttle, and
   j. a third switch means in said console connected via said control cable to said throttle advance means for actuating said throttle advance means and controlling the movement of said gas throttle.

2. A remote control motor-vehicle-starting system set forth in claim 1 wherein a pair of contacts of said first relay means are connected in circuit for coupling an indication source in said engine to an indicator lamp in said console.

* * * * *